(12) United States Patent
Hong et al.

(10) Patent No.: US 11,803,331 B2
(45) Date of Patent: Oct. 31, 2023

(54) METHOD FOR RECORDING UNIT MANAGEMENT INFORMATION, MEMORY STORAGE DEVICE AND MEMORY CONTROL CIRCUIT UNIT

(71) Applicant: Hefei Core Storage Electronic Limited, Anhui (CN)

(72) Inventors: Wan-Jun Hong, Anhui (CN); Yang Zhang, Anhui (CN); Wenbin Tao, Jiangxi (CN); Hao Yang, Henan (CN); Mengkai Wu, Henan (CN); Yankai Dai, Henan (CN)

(73) Assignee: Hefei Core Storage Electronic Limited, Anhui (CN)

( * ) Notice: Subject to any disclaimer, the term of this patent is extended or adjusted under 35 U.S.C. 154(b) by 85 days.

(21) Appl. No.: 17/565,380

(22) Filed: Dec. 29, 2021

(65) Prior Publication Data

US 2023/0176782 A1 Jun. 8, 2023

(30) Foreign Application Priority Data

Dec. 7, 2021 (CN) .......................... 202111488077.4

(51) Int. Cl.
*G06F 3/06* (2006.01)
(52) U.S. Cl.
CPC .......... *G06F 3/0659* (2013.01); *G06F 3/0604* (2013.01); *G06F 3/0619* (2013.01); *G06F 3/0679* (2013.01)
(58) Field of Classification Search
CPC .. G06F 12/0246; G06F 3/0659; G06F 3/0604; G06F 3/0619; G06F 3/0679
See application file for complete search history.

(56) References Cited

U.S. PATENT DOCUMENTS 10,289,334 B2 5/2019 Yan
2017/0329525 A1* 11/2017 Simonson ........... G06F 11/3034
(Continued)

FOREIGN PATENT DOCUMENTS

CN 110390985 8/2021
TW I585770 6/2017
(Continued)

OTHER PUBLICATIONS

"Office Action of Taiwan Counterpart Application", dated Aug. 31, 2022, pp. 1-5.

*Primary Examiner* — Edward J Dudek, Jr.
(74) *Attorney, Agent, or Firm* — JCIPRNET

(57) ABSTRACT

A memory management method, a memory storage device and a memory control circuit unit are disclosed. The method includes: performing a first write operation to store first data to a first physical unit; recording first unit management information corresponding to the first write operation, wherein the first unit management information reflects a usage order of first used physical units, and the first used physical units include the first physical unit; performing data merge operation to copy at least a part of data stored in the first physical unit to a second physical unit; and after the data merge operation is performed, recording second unit management information according to the first unit management information, wherein the second unit management information reflects a usage order of second used physical units. The second used physical units include the second physical unit but do not include the first physical unit.

15 Claims, 9 Drawing Sheets

(56) References Cited

U.S. PATENT DOCUMENTS

2020/0133843 A1* 4/2020 Muchherla .......... G06F 12/0253
2021/0406193 A1* 12/2021 Dancho ............... G06F 12/1009

FOREIGN PATENT DOCUMENTS

| TW | I668570 | 8/2019 |
| TW | I705331 | 9/2020 |

* cited by examiner

METHOD FOR RECORDING UNIT MANAGEMENT INFORMATION, MEMORY STORAGE DEVICE AND MEMORY CONTROL CIRCUIT UNIT

CROSS-REFERENCE TO RELATED APPLICATION

This application claims the priority benefit of China application serial no. 202111488077.4, filed on Dec. 7, 2021. The entirety of the above-mentioned patent application is hereby incorporated by reference herein and made a part of this specification.

BACKGROUND

Technical Field

The disclosure relates to a memory management technology, and particularly relates to a memory management method, a memory storage device, and a memory control circuit unit.

Description of Related Art

The rapid growth of smart phones and tablet computers in recent years has led to a rapid increase in consumer demand for storage media. As the rewritable non-volatile memory module (for example, flash memory) is characterized in non-volatile data, power saving, small size, and no mechanical structure, it is very suitable to be embedded in the various portable multimedia devices mentioned above.

When the rewritable non-volatile memory module loses data due to abnormal power off and other reasons, if there is a mapping table for recording mapping information, the required data may be read from the rewritable non-volatile memory module according to the mapping information recorded in the mapping table. However, if the mapping table is also lost or damaged, it is necessary to perform a full-disc scan through a specific tool program to rebuild the mapping table and recover the lost data. Therefore, how to improve the efficiency of data recovery is indeed one of the issues to be explored by practitioners in the relevant fields.

SUMMARY

The disclosure provides a memory management method, a memory storage device, and a memory control circuit unit, which can improve the work efficiency of data recovery in subsequent process.

An exemplary embodiment of the disclosure provides a memory management method, which is used for a rewritable non-volatile memory module. The rewritable non-volatile memory module includes multiple physical units. The memory management method includes: performing a first write operation to store first data to a first physical unit of the multiple physical units; recording first unit management information corresponding to the first write operation, the first unit management information reflects a usage order of the multiple first used physical units, and the multiple first used physical units include the first physical unit; performing data merge operation to copy at least a part of data stored in the first physical unit to a second physical unit of the multiple physical units; and after the data merge operation is performed, recording second unit management information according to the first unit management information, and the second unit management information reflects a usage order of the multiple second used physical units. The multiple second used physical units include the second physical unit but do not include the first physical unit.

An exemplary embodiment of the disclosure further provides a memory storage device, which includes a connection interface unit, a rewritable non-volatile memory module, and a memory control circuit unit. The connection interface unit is configured for coupling to a host system. The rewritable non-volatile memory module includes multiple physical units. The memory control circuit unit is coupled to the connection interface unit and the rewritable non-volatile memory module. The memory control circuit unit is configured for performing a first write operation to store first data to a first physical unit of the multiple physical units; recording first unit management information corresponding to the first write operation, the first unit management information reflects a usage order of the multiple first used physical units, and the multiple first used physical units include the first physical unit; performing data merge operation to copy at least a part of data stored in the first physical unit to a second physical unit of the multiple physical units; and after the data merge operation is performed, recording second unit management information according to the first unit management information, and the second unit management information reflects a usage order of the multiple second used physical units. The multiple second used physical units include the second physical unit but do not include the first physical unit.

An exemplary embodiment of the disclosure further provides a memory control circuit unit for controlling a rewritable non-volatile memory module. The memory control circuit unit includes a host interface, a memory interface, and a memory management circuit. The host interface is configured for coupling to a host system. The memory interface is configured for coupling to the rewritable non-volatile memory module. The rewritable non-volatile memory module includes multiple physical units. The memory management circuit is coupled to the host interface and the memory interface. The memory management circuit is configured for performing a first write operation to store first data to a first physical unit of the multiple physical units; recording first unit management information corresponding to the first write operation, the first unit management information reflects a usage order of the multiple first used physical units, and the multiple first used physical units include the first physical unit; performing data merge operation to copy at least a part of data stored in the first physical unit to a second physical unit of the multiple physical units; and after the data merge operation is performed, recording second unit management information according to the first unit management information, and the second unit management information reflects a usage order of the multiple second used physical units. The multiple second used physical units include the second physical unit but do not include the first physical unit.

Based on the above, after the first write operation is performed to store the first data in the first physical unit, the first unit management information can be recorded to reflect the usage order of the multiple first used physical units, and the multiple first used physical units may include the first physical unit. In addition, after a data merge operation is performed to copy at least part of the data in the first physical unit to the second physical unit, the second unit management information can be recorded according to the first unit management information to reflect the usage order of the multiple second used physical units. In particular, the multiple second used physical units may include the second physical unit but do not include the first physical unit. In this way, the work efficiency of data recovery performed in the subsequent process based on the unit management information can be improved.

DESCRIPTION OF THE EMBODIMENTS

Generally speaking, a memory storage device (also known as a memory storage system) includes a rewritable non-volatile memory module and a controller (also known as a control circuit). The memory storage device may be used together with the host system, so that the host system can write data to the memory storage device or read data from the memory storage device.

Figure 1:
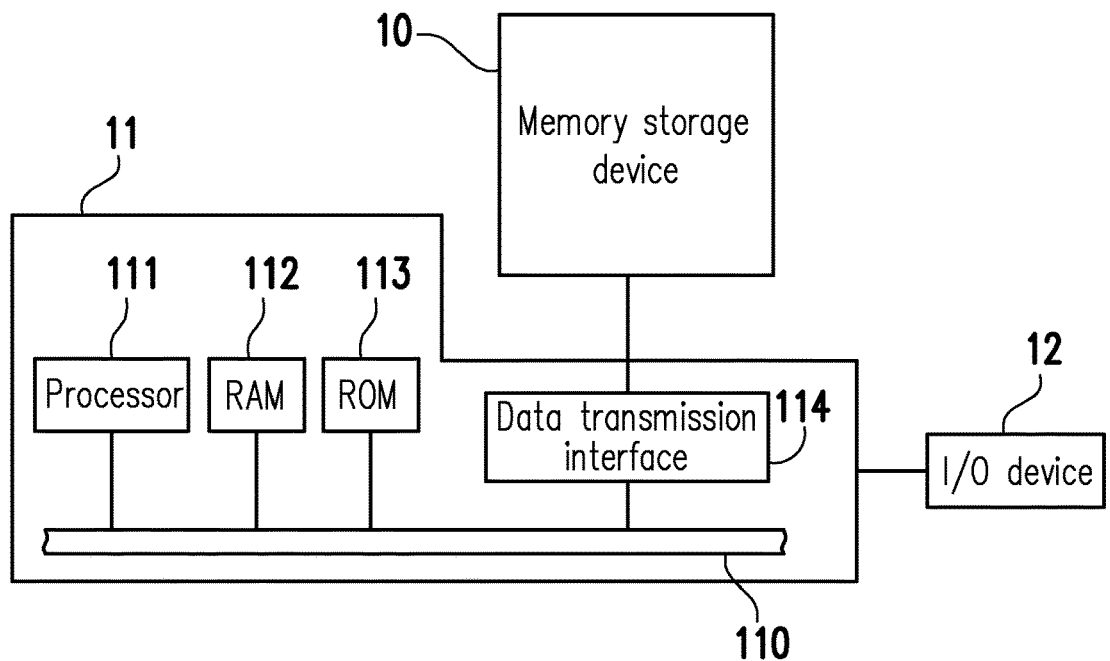
FIG. 1 is a schematic diagram of a host system, a memory storage device, and an input/output (I/O) device according to an exemplary embodiment of the disclosure.
Figure 2:
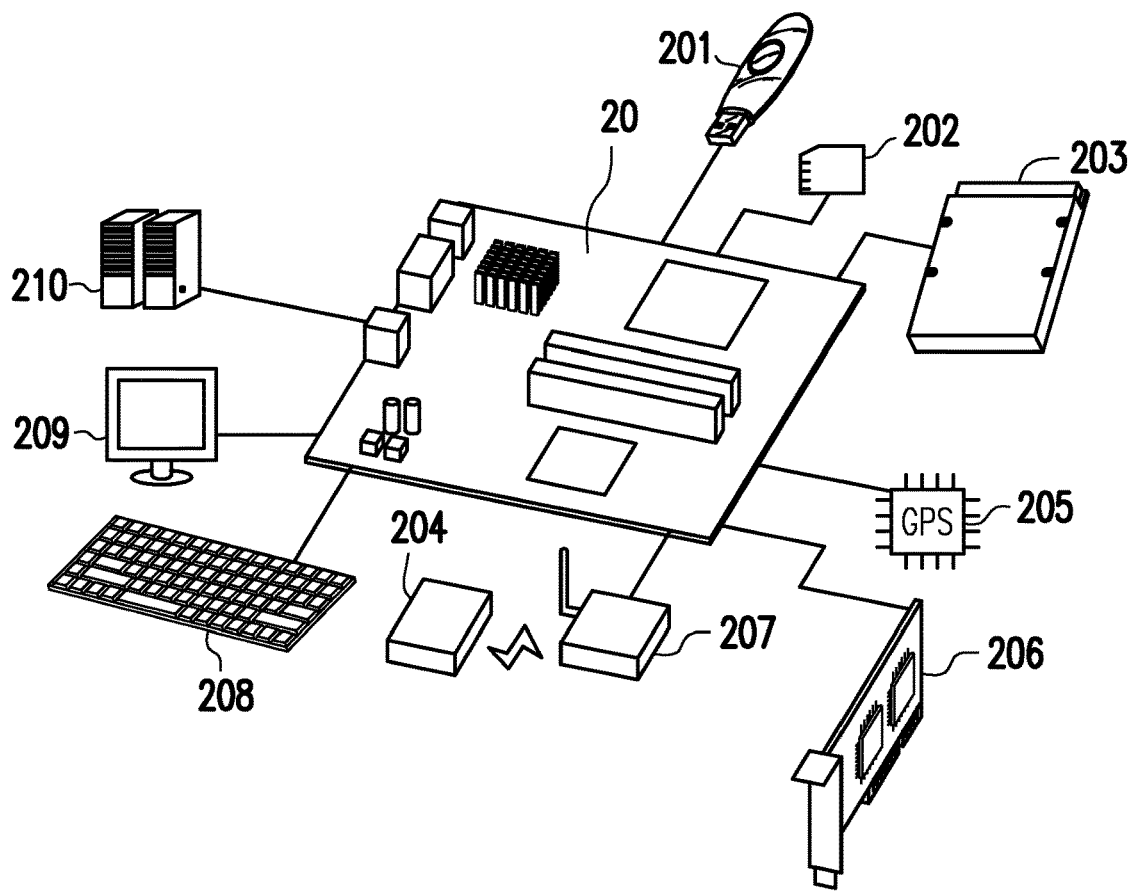
FIG. 2 is a schematic diagram of a host system, a memory storage device, and an input/output (I/O) device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an input/output (I/O) device according to an exemplary embodiment of the disclosure.

Please refer to FIG. 1 and FIG. 2, the host system 11 may include a processor 111, a RAM (random access memory) 112, a ROM (read only memory) 113 and a data transmission interface 114. The processor 111, the random access memory 112, the read-only memory 113, and the data transmission interface 114 may be coupled to a system bus 110.

In an exemplary embodiment, the host system 11 is coupled to the memory storage device 10 through the data transmission interface 114. For example, the host system 11 can store data to the memory storage device 10 or read data from the memory storage device 10 through the data transmission interface 114. In addition, the host system 11 may be coupled to the I/O device 12 through the system bus 110. For example, the host system 11 can transmit output signals to the I/O device 12 or receive input signals from the I/O device 12 through the system bus 110.

In an exemplary embodiment, the processor 111, the random access memory 112, the read-only memory 113, and the data transmission interface 114 may be disposed on the motherboard 20 of the host system 11. The number of data transmission interfaces 114 may be one or more. Through the data transmission interface 114, the motherboard 20 may be coupled to the memory storage device 10 in a wired or wireless manner.

In an exemplary embodiment, the memory storage device 10 may be, for example, a flash drive 201, a memory card 202, a SSD (solid state drive) 203, or a wireless memory storage device 204. The wireless memory storage device 204 may be, for example, a memory storage device based on various wireless communication technologies, such as a NFC (Near Field Communication Storage) memory storage device, a WiFi (Wireless Fidelity) memory storage device, a Bluetooth memory storage device, or a BLE (Bluetooth low energy) memory storage device (e.g., iBeacon). Further, the motherboard 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the motherboard 20 can access the wireless memory storage device 204 through the wireless transmission device 207.

In an exemplary embodiment, the host system 11 is a computer system. In an exemplary embodiment, the host system 11 may be any system capable of substantially cooperating with the memory storage device for storing data. In an exemplary embodiment, the memory storage device 10 and the host system 11 may respectively include the memory storage device 30 and the host system 31 of FIG. 3.

Figure 3:
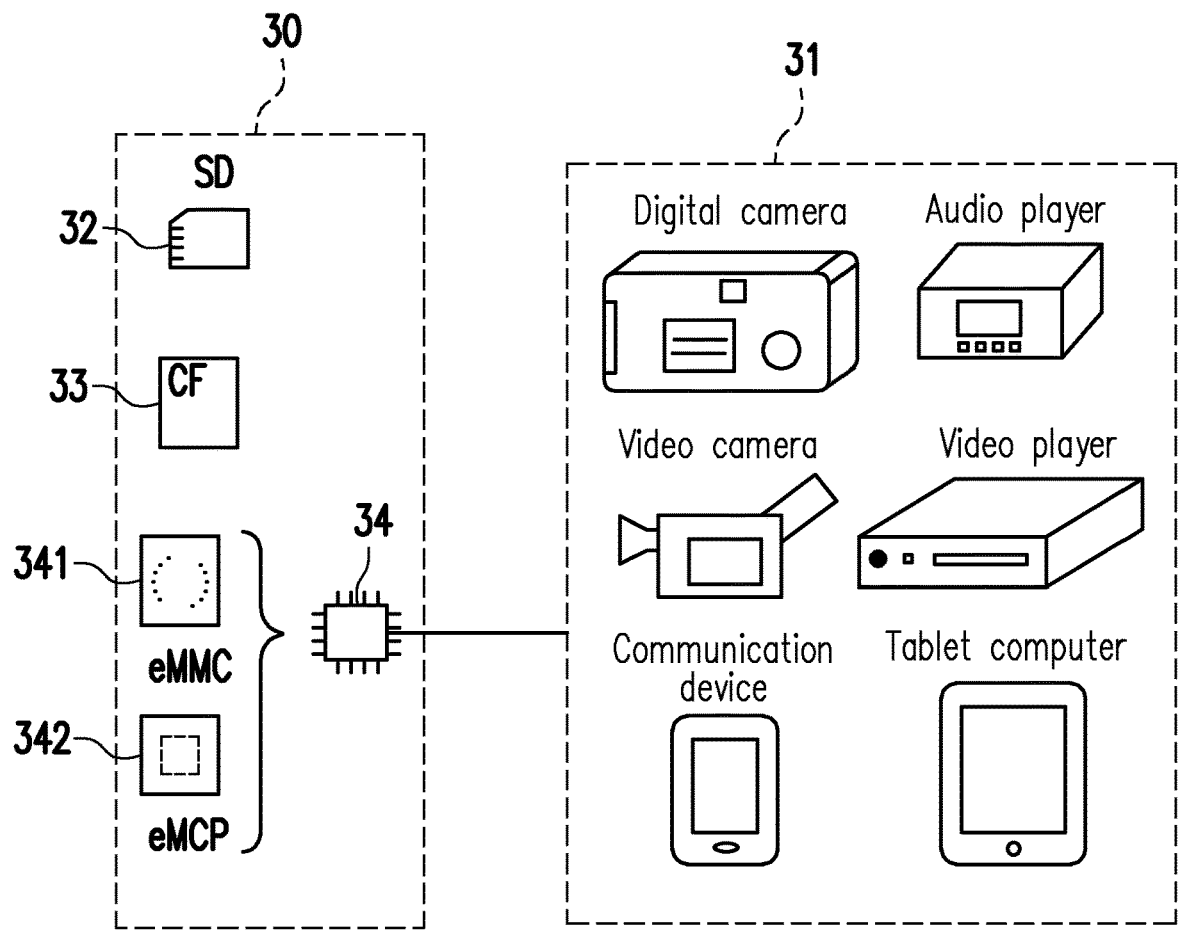
FIG. 3 is a schematic diagram of a host system and a memory storage device according to an exemplary embodiment of the disclosure.

FIG. 3 is a schematic diagram illustrating a host system and a memory storage device according to another exemplary embodiment of the disclosure. Referring to FIG. 3, the memory storage device 30 may be used in conjunction with the host system 31 to store data. For example, the host system 31 may also be a system including a digital camera, a video camera, a communication device, an audio player, a video player or a tablet computer. For example, the memory storage device 30 may be various non-volatile memory storage devices used by the host system 31, such as a SD (secure digital) card 32, a CF (compact flash) card 33 or an embedded storage device 34. The embedded storage device 34 includes various embedded storage devices capable of directly coupling a memory module onto a substrate of the host system, such as an eMMC (embedded MMC) 341 and/or an eMCP (embedded Multi Chip Package) storage device 342.

Figure 4:
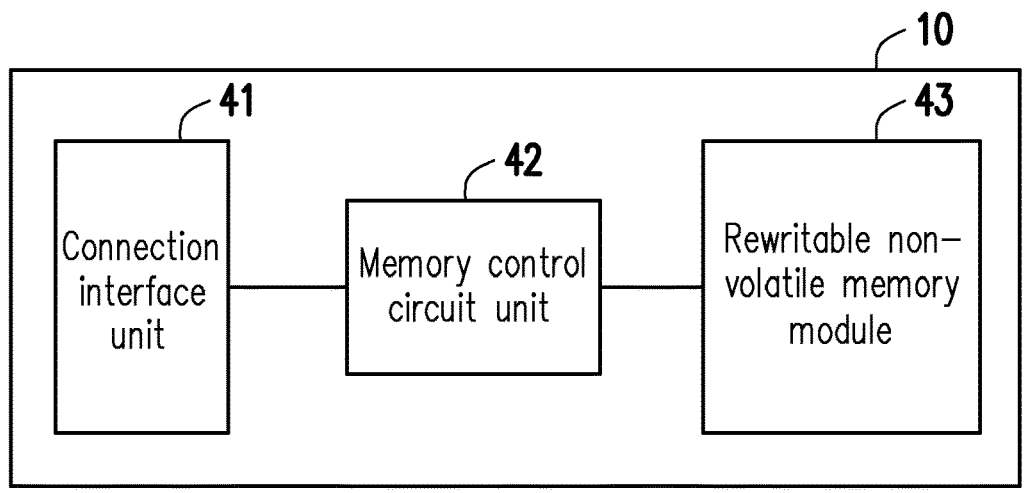
FIG. 4 is a schematic diagram of a memory storage device according to an exemplary embodiment of the disclosure.

FIG. 4 is a schematic diagram of a memory storage device according to an exemplary embodiment of the disclosure. Referring to FIG. 4, the memory storage device 10 includes a connection interface unit 41, a memory control circuit unit 42 and a rewritable non-volatile memory module 43.

The connection interface unit 41 is used to couple the memory storage device 10 to the host system 11. The memory storage device 10 may communicate with the host system 11 through the connection interface unit 41. In an exemplary embodiment, the connection interface unit 41 is compatible with a PCI Express (Peripheral Component Interconnect Express) standard. In an exemplary embodiment, the connection interface unit 41 may also be compatible with a SATA (Serial Advanced Technology Attachment) standard, a PATA (Parallel Advanced Technology Attachment) standard, an IEEE (Institute of Electrical and Electronic Engineers) 1394 standard, a USB (Universal Serial Bus) standard, a SD (Secure Digital) interface standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC (Embedded Multimedia Card) interface standard, a UFS (Universal Flash Storage) interface standard, an eMCP (embedded Multi Chip Package) interface standard, a CF (Compact Flash) interface standard, an IDE (Integrated Device Electronics) interface standard or other suitable standards. The connection interface unit 41 and the memory control circuit unit 42 may be packaged into one chip, or the connection interface unit 41 is distributed outside of a chip containing the memory control circuit unit 42.

The memory control circuit unit 42 is coupled to the connection interface unit 41 and the rewritable non-volatile memory module 43. The memory control circuit unit 42 is configured to perform multiple logic gates or control commands implemented in the form of hardware or firmware, and perform data writing, data reading, and data erasing in the rewritable non-volatile memory module 43 according to the commands of the host system 11.

The rewritable non-volatile memory module 43 is configured to store the data written by the host system 11. The rewritable non-volatile memory module 43 may include a SLC (Single Level Cell) NAND flash memory module (i.e., a flash memory module in which one memory cell capable of storing one bit), a MLC (Multi Level Cell) NAND flash memory module (i.e., a flash memory module in which one memory cell capable of storing two bits), a TLC (Triple Level Cell) NAND flash memory module (i.e., a flash memory module in which one memory cell capable of storing three bits), a QLC (Quad Level Cell) NAND flash memory module (i.e., a flash memory module in which one memory cell capable of storing four bits), other flash memory modules or other memory modules with the same characteristics.

Each memory cell in the rewritable non-volatile memory module 43 stores one or more bits with a change in voltage (hereinafter also referred to as a threshold voltage). Specifically, there is a charge trapping layer between the control gate and the channel of each memory cell. By applying a write voltage to the control gate, the amount of electrons in the charge trapping layer can be changed, thereby changing the threshold voltage of the memory cell. The operation of changing the threshold voltage of the memory cell is also called "writing data into the memory cell" or "programming the memory cell". As the threshold voltage changes, each memory cell in the rewritable non-volatile memory module 43 has a multiple storage states. By applying the read voltage, it is possible to determine which storage state a memory cell belongs to, thereby obtaining one or more bits stored in the memory cell.

In an exemplary embodiment, the memory cells of the rewritable non-volatile memory module 43 may constitute multiple physical programming units, and these physical programming units may constitute multiple physical erasing units. Specifically, the memory cells on the same word line can form one or more physical programming units. If each memory cell can store two bits or more, the physical programming unit on the same word line may at least be classified into a lower physical programming unit and an upper physical programming unit. For example, the least significant bit (LSB) of a memory cell belongs to the lower physical programming unit, and the most significant bit (MSB) of a memory cell belongs to the upper physical programming unit. Generally speaking, in MLC NAND flash memory, the writing speed of the lower physical programming unit is greater than that of the upper physical programming unit, and/or the reliability of the lower physical programming unit is higher than that of the upper physical programming unit.

In an exemplary embodiment, the physical programming unit is a minimum unit for programming. That is, the physical programming unit is the minimum unit for writing data. For example, the physical programming unit is a physical page or a physical sector. If the physical programming unit is a physical page, the physical programming units may include a data bit area and a redundancy bit area. The data bit area has multiple physical sectors configured to store user data, and the redundant bit area is configured to store system data (e.g., an error correcting code). In an exemplary embodiment, the data bit area contains 32 physical sectors, and a size of each physical sector is 512-byte (B). However, in another exemplary embodiments, the data bit area may also include 8, 16, or more or less of the physical sectors, and a size of the physical sectors may be larger or smaller. On the other hand, the physical erasing unit is the minimal unit for erasing. Namely, each physical erasing unit contains the least number of memory cells to be erased together. For instance, the physical erasing unit is a physical block.

Figure 5:
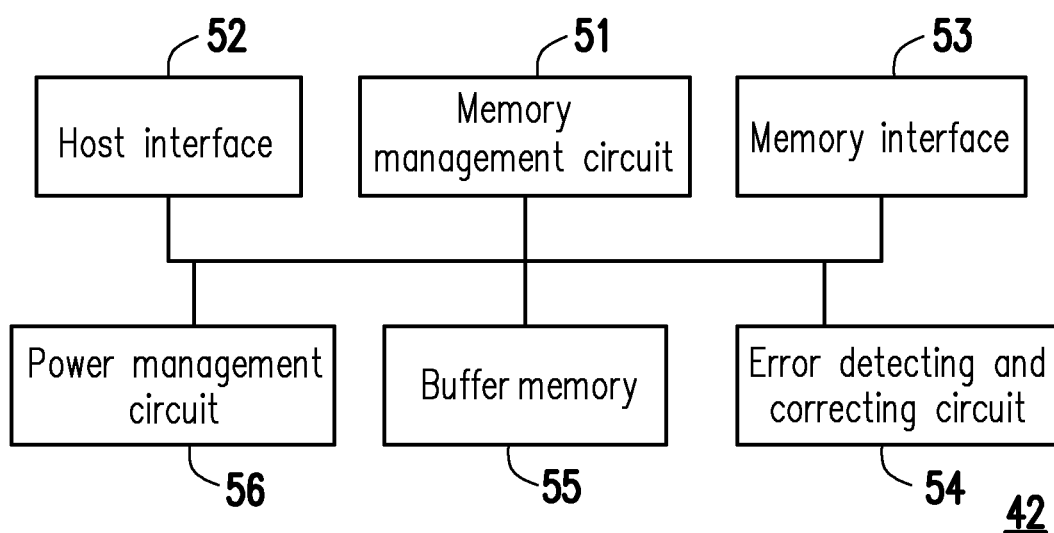
FIG. 5 is a schematic diagram of a memory control circuit unit according to an exemplary embodiment of the disclosure.

FIG. 5 is a schematic diagram of a memory control circuit unit according to an exemplary embodiment of the disclosure. Please refer to FIG. 5, the memory control circuit unit 42 includes a memory management circuit 51, a host interface 52 and a memory interface 53.

The memory management circuit 51 is configured to control the overall operation of the memory control circuit unit 42. Specifically, the memory management circuit 51 has multiple control commands, and when the memory storage device 10 is operating, these control commands are executed to perform operations such as writing, reading, and erasing data. The following description of the operation of the memory management circuit 51 is equivalent to the description of the operation of the memory control circuit unit 42.

In an exemplary embodiment, the control commands of the memory management circuit 51 are implemented in the form of firmware. For example, the memory management circuit 51 has a microprocessor unit (not shown) and a read-only memory (not shown), and these control commands are burned into the read-only memory. When the memory storage device 10 is operating, these control commands are executed by the microprocessor unit to perform data writing, reading, and erasing operations.

In another exemplary embodiment, the control commands of the memory management circuit 51 may also be stored as program codes in a specific area (for example, the system area in a memory module exclusively used for storing system data) of the rewritable non-volatile memory module 43. In addition, the memory management circuit 51 has a microprocessor unit (not illustrated), a ROM (not illustrated) and a RAM (not illustrated). More particularly, the ROM has a boot code, which is executed by the microprocessor unit to load the control commands stored in the rewritable non-volatile memory module 43 to the RAM of the memory management circuit 51 when the memory controlling circuit unit 42 is enabled. Thereafter, the control commands are executed by the microprocessor unit to perform operations of writing, reading or erasing data.

In an exemplary embodiment, the control commands of the memory management circuit 51 may also be implemented in a form of hardware. For example, the memory management circuit 51 includes a microcontroller, a memory cell management circuit, a memory writing unit, a memory reading unit, a memory erasing unit and a data processing unit. The memory cell management circuit, the memory writing unit, the memory reading unit, the memory erasing unit and the data processing unit are coupled to the microprocessor. The memory cell management circuit is configured to manage memory cell or memory cell group of the rewritable non-volatile memory module 43. The memory writing circuit is configured to issue a write command sequence to the rewritable non-volatile memory module 43 in order to write data to the rewritable non-volatile memory module 43. The memory reading circuit is configured to issue a read command sequence to the rewritable non-volatile memory module 43 in order to read data from the rewritable non-volatile memory module 43. The memory erasing circuit is configured to issue an erase command to the rewritable non-volatile memory module 43 in order to erase data from the rewritable non-volatile memory module 43. The data processing circuit is configured to process both the data to be written to the rewritable non-volatile memory module 43 and the data to be read from the rewritable non-volatile memory module 43. The write command sequence, the read command sequence and the erase command sequence may each include one or more program codes or command codes and are used to instruct the rewritable non-volatile memory module 43 to perform corresponding writing, reading and erasing operations. In an exemplary embodiment, the memory management circuit 51 may further issue other types of command sequences to the rewritable non-volatile memory module 43 to instruct the rewritable non-volatile memory module 43 to perform corresponding operations.

The host interface 52 is coupled to the memory management circuit 51. The memory management circuit 51 may communicate with the host system 11 through the host interface 52. The host interface 52 may be configured to receive and identify commands and data sent from the host system 11. For example, the commands and data sent from the host system 11 are transmitted to the memory management circuit 51 through the host interface 52. In addition, the memory management circuit 51 may transmit data to the host system 11 through the host interface 52. In the present exemplary embodiment, the host interface 52 is compatible with a PCI Express standard. However, it should be understood that the disclosure is not limited thereto, and the host interface 52 may also be compatible with a SATA standard, a PATA standard, an IEEE 1394 standard, a USB standard, a SD standard, a UHS-I standard, a UHS-II standard, a MS standard, a MMC standard, a eMMC standard, a UFS standard, a CF standard, an IDE standard, or other suitable standards for data transmission.

The memory interface 53 is coupled to the memory management circuit 51 and configured to access the rewritable non-volatile memory module 43. For example, the memory management circuit 51 may access the rewritable non-volatile memory module 43 through the memory interface 53. That is, data to be written to the rewritable non-volatile memory module 43 is converted to a format acceptable to the rewritable non-volatile memory module 43 through the memory interface 53. Specifically, if the memory management circuit 51 intends to access the rewritable non-volatile memory module 43, the memory interface 53 sends corresponding command sequences. For example, the command sequences may include a write command sequence instructing to write data, a read command sequence instructing to read data, an erase command sequence instructing to erase data, and corresponding command sequences for instructing various memory operations (for example, changing the read voltage level or performing garbage collection operations, etc.) These command sequences are, for example, generated by the memory management circuit 51 and transmitted to the rewritable non-volatile memory module 43 through the memory interface 53. The command sequences may include one or more signals, or data from the bus. These signals or data may include scripts or program codes. For example, in a read command sequence, information such as identification codes and memory addresses are included.

In an exemplary embodiment, the memory control circuit unit 42 further includes an error checking and correcting circuit 54, a buffer memory 55, and a power management circuit 56.

The error checking and correcting circuit 54 is coupled to the memory management circuit 51 and configured to execute an error checking and correcting process to ensure the correctness of data. Specifically, when the memory management circuit 51 receives the writing command from the host system 11, the error checking and correcting circuit 54 generates a corresponding error correcting code (ECC) and/or an error detecting code (EDC) for data corresponding to the writing command, and the memory management circuit 51 writes data and the corresponding ECC and/or the EDC corresponding to the writing command to the rewritable non-volatile memory module 43. Subsequently, when the memory management circuit 51 reads the data from the rewritable non-volatile memory module 43, the ECC and/or the EDC corresponding to the data is also read from the rewritable non-volatile memory module 43, and the error checking and correcting circuit 54 executes the error checking and correcting process for the read data based on the ECC and/or the EDC.

The buffer memory 55 is coupled to the memory management circuit 51 and configured to temporarily store data. The power management circuit 56 is coupled to the memory management circuit 51 and configured to control a power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
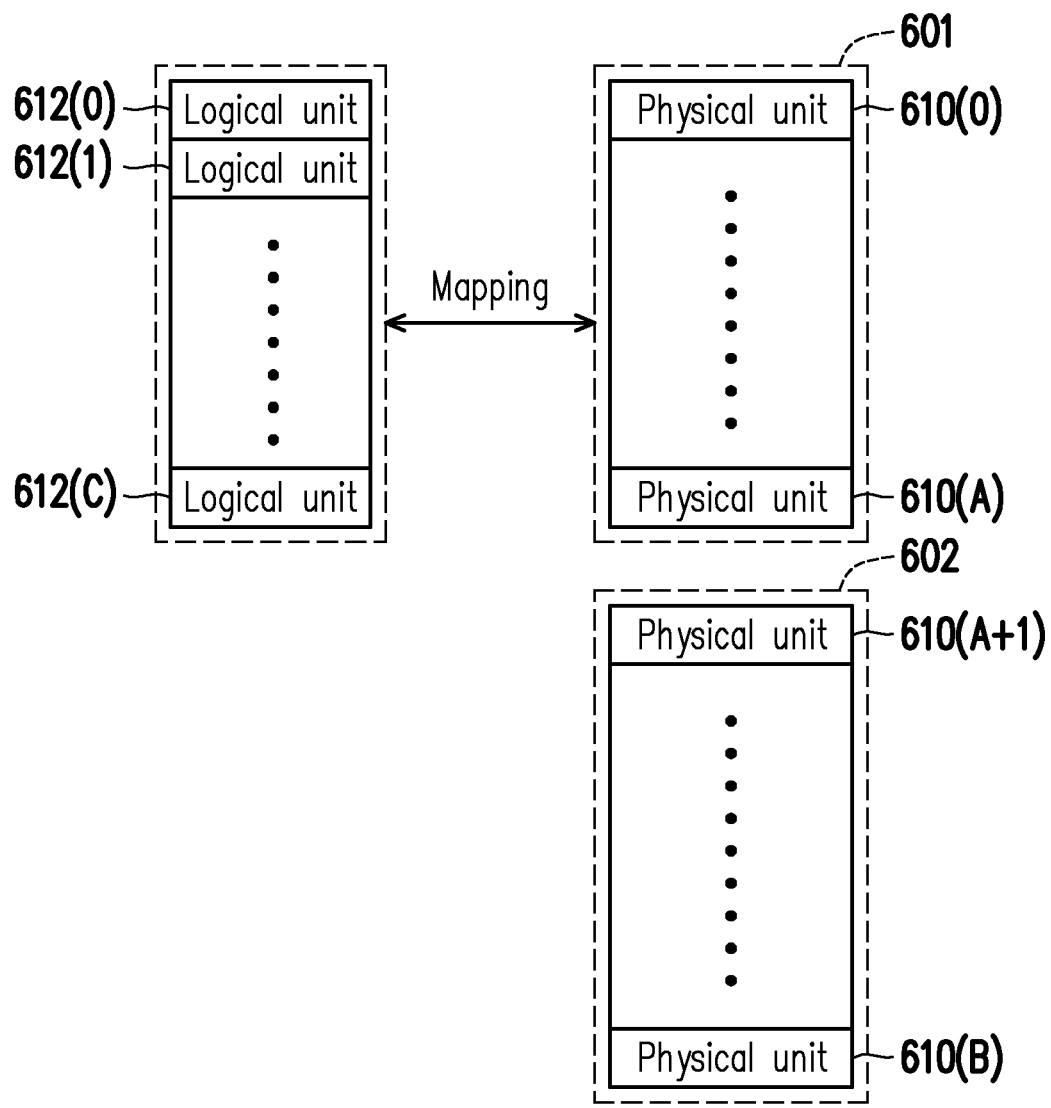
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure. Please refer to FIG. 6, the memory management circuit 51 may logically group the physical units 610(0) to 610(B) in the rewritable non-volatile memory module 43 into a storage area 601 and a spare area 602. In an exemplary embodiment, a physical unit refers to one physical erasing unit. In an exemplary embodiment, a physical unit may also refer to a virtual block (VB), which includes multiple physical erasing units.

The physical units 610(0) to 610(A) in the storage area 601 are used to store user data (for example, user data from the host system 11 in FIG. 1). For example, the physical units 610(0) to 610(A) in the storage area 601 may store valid data and invalid data. The physical units 610(A+1) to 610(B) in the spare area 602 do not store data (for example, valid data). For example, if a certain physical unit does not store valid data, this physical unit may be associated (or added) to the spare area 602. Additionally, the physical units in the spare area 602 (or physical units that do not store valid data) may be erased. When writing new data, one or more physical units may be extracted from the spare area 602 to store the new data. In an exemplary embodiment, the spare area 602 is also referred to as a free pool.

The memory management circuit 51 may be configured with logical units 612(0) to 612(C) to map the physical units 610(0) to 610(A) in the storage area 601. In an exemplary embodiment, each logical unit corresponds to one logical address. For example, one logical address may include one or more logical block addresses (LBA) or other logical management units. In an exemplary embodiment, a logical unit may also correspond to one logical erasing unit or consist of multiple logical addresses.

It should be noted that one logical unit may be mapped to one or more physical units. If a certain physical unit is currently mapped by a certain logical unit, it means that the data currently stored in this physical unit includes valid data. Otherwise, if a certain physical unit is currently not mapped by any logical unit, it means that the data currently stored in this physical unit is invalid data.

The memory management circuit 51 can record management data (also referred to as logical-to-physical mapping information) describing the mapping relationship between logical units and physical units in at least one logical-to-physical mapping table. When the host system 11 is set to read data from the memory storage device 10 or write data to the memory storage device 10, the memory management circuit 51 may access the rewritable non-volatile memory module 43 according to the information in the logical-to-physical mapping table.

When the physical units belonging to the spare area 602 are insufficient (for example, the total number of physical units belonging to the spare area 602 is less than a preset number), the memory management circuit 502 may perform a data merge operation to increase the total number of physical units in the spare area 602. In an exemplary embodiment, the data merge operation is also referred to as a garbage collection operation.

In the data merge operation, the memory management circuit 502 may select at least one physical unit (also referred to as a source unit) from the storage area 601 and try to copy valid data from the selected physical unit to another physical unit (also called target unit). The physical unit used to store the copied valid data is also selected from the spare area 602 and will be associated with the storage area 601. If the valid data stored in a certain physical unit has been copied to the target unit, the physical unit may be erased and associated with the spare area 602.

In an exemplary embodiment, the operation of re-associating a certain physical unit from the storage area 601 back to the spare area 602 (or the operation of erasing a certain physical unit) is also referred to as releasing a spare physical unit. By performing the data merge operation, one or more spare physical units will be released so that the total number of physical units belonging to the spare area 602 will gradually increase.

Figure 7:
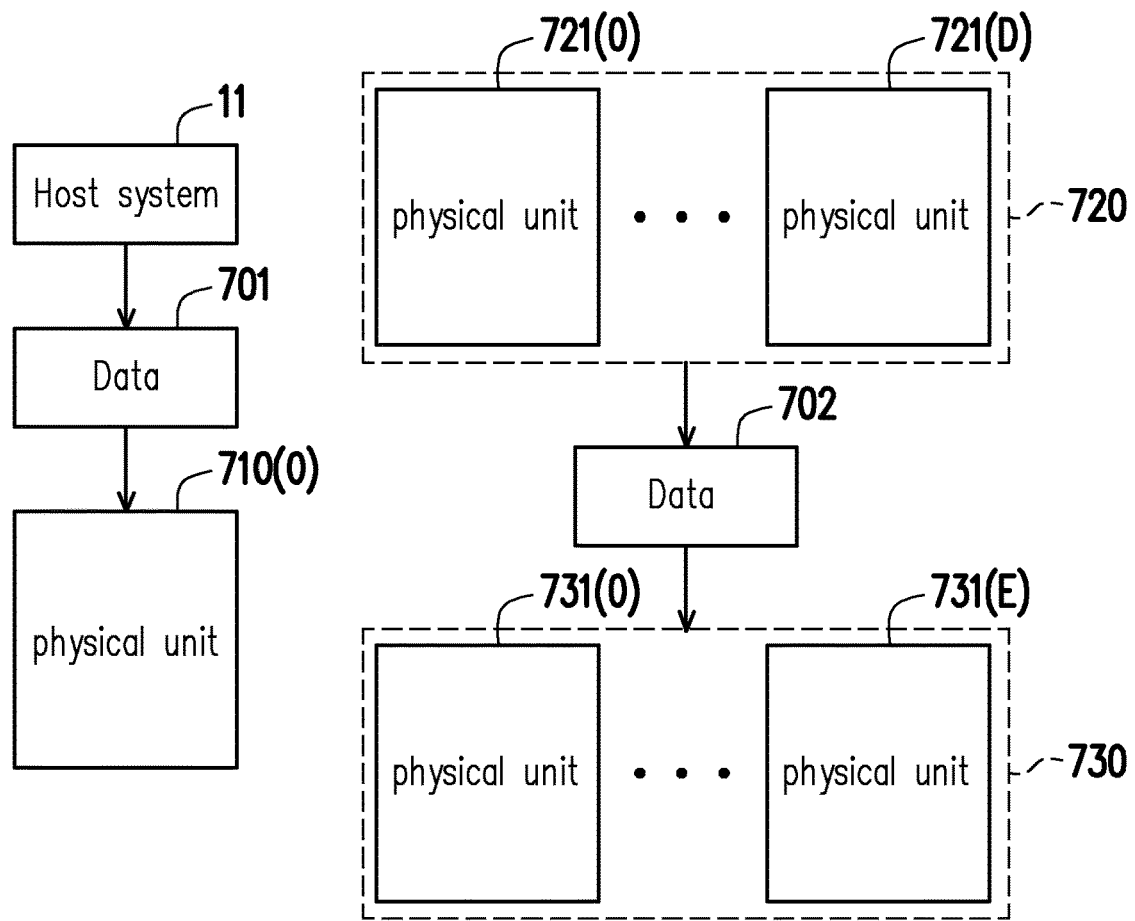
FIG. 7 is a schematic diagram illustrating a host write operation and data merge operation according to an exemplary embodiment of the disclosure.

FIG. 7 is a schematic diagram illustrating a host write operation and data merge operation according to an exemplary embodiment of the disclosure. Referring to FIG. 7, in the host write operation, the host system 11 may send at least one write command to instruct to write the data 701 to a certain logical unit. According to the write command, the data 701 can be stored in the physical unit 710(0) mapped to the logical unit. For example, the physical unit 710(0) may be selected from the spare area 602 in FIG. 6.

On the other hand, in the data merge operation, the data 702 may be collected from the physical units 721(0) to 721(D) belonging to the source unit 720 and copied to the physical units 731(0) to 731(E) belonging to the target unit 730. For example, the data 702 includes valid data. The physical units 721(0) to 721(D) belonging to the source unit 720 is selected from the storage area 601 of FIG. 6, and the physical units 731(0) to 731(E) belonging to the target unit 730 is selected from the spare area 602 of FIG. 6.

In an exemplary embodiment, the memory management circuit 502 can execute a write operation (also referred to as a first write operation) according to a write command from the host system 11, so as to store the data (also referred to as the first data) indicated by the write command in a certain physical unit (also referred to as the first physical unit) in FIG. 6. The memory management circuit 502 may record the unit management information (also referred to as the first unit management information) corresponding to the first physical unit to correspond to the first write operation. The first unit management information may reflect the usage order of multiple used physical units (also referred to as the first used physical unit). The used physical unit refers to the physical unit that has been used to store data. More specifically, the multiple first used physical units include a first physical unit. Thereafter, according to the first unit management information, the memory management circuit 502 can obtain the usage order of the multiple first used physical units including the first physical unit.

In an exemplary embodiment, after storing the first data in the first physical unit, the memory management circuit 502 may perform a data merge operation to copy at least part of the data in the first physical unit to another physical unit (also known as the second physical unit) in FIG. 6. That is, in this exemplary embodiment, the first physical unit belongs to the source unit used to collect valid data, and the second physical unit belongs to the target unit used to store valid data. After performing the data merge operation, the memory management circuit 502 may record the unit management information (also referred to as the second unit management information) corresponding to the second physical unit according to the first unit management information. The second unit management information may reflect the usage order of multiple used physical units (also referred to as second used physical units). More specifically, compared to the first used physical units, the multiple second used physical units include the second physical unit but do not include the first physical unit. Thereafter, according to the second unit management information, the memory management circuit 502 can obtain the usage order of multiple second used physical units that include the second physical unit but not the first physical unit.

In an exemplary embodiment, the first unit management information includes the sequence information of the multiple first used physical units, and the second unit management information includes the sequence information of the multiple second used physical units. The sequence information of the multiple first used physical units may reflect the usage order of the multiple first used physical units. The sequence information of the multiple second used physical units may reflect the usage order of the multiple second used physical units.

In an exemplary embodiment, in the operation of recording the second unit management information according to the first unit management information, the memory management circuit 502 may remove the sequence information of the first physical unit from the sequence information of the multiple first used physical units. Then, the memory management circuit 502 may obtain the sequence information of the multiple second used physical units according to the sequence information of the second physical unit and the remaining physical units (that is, the remaining physical units in the multiple first used physical units that do not include the first physical unit) in the multiple first used physical units.

In an exemplary embodiment, the first unit management information and the second unit management information may be stored in the first physical unit and the second physical unit, respectively. For example, the first unit management information may be stored in a certain physical programming unit (also referred to as the first physical programming unit) in the first physical unit. For example, the first physical programming unit may be the last physical programming unit in the first physical unit. For example, the second unit management information may be stored in a certain physical programming unit (also referred to as a second physical programming unit) in the second physical unit. For example, the second physical programming unit may be the last physical programming unit in the second physical unit. In addition, the first physical programming unit and the second physical programming unit may also be the physical programming unit of any one of the first physical unit and the second physical unit respectively, and the disclosure is not limited thereto. Alternatively, in an exemplary embodiment, the first unit management information and the second unit management information may also be stored in a specific management table, which is not limited by the disclosure.

In an exemplary embodiment, before performing the data merge operation, the memory management circuit 502 may further perform another write operation (also referred to as a second write operation) to store another data (also referred to as second data) in another physical unit (also referred to as the third physical unit) in FIG. 6. The second write operation may be performed before or after the first write operation. In the exemplary embodiment, the multiple second used physical units further include a third physical unit, and the second unit management information may further reflect the usage order of the multiple second used physical units including the second physical unit and the third physical unit.

In an exemplary embodiment, corresponding to the first write operation, the memory management circuit 502 may update the written stamp corresponding to the first physical unit. In addition, corresponding to the data merge operation, the memory management circuit 502 may update the written stamp corresponding to the second physical unit. The written stamp may be implemented as a timestamp or any type of marking information. The memory management circuit 502 may obtain the usage order of multiple used physical units (for example, the first used physical unit and the second used physical unit) according to the written stamp corresponding to various physical units. Additionally, the written stamp may be stored in corresponding physical units (such as the first physical programming unit and the second physical programming unit) or in a specific management table, which is not limited by the disclosure.

Figure 8:
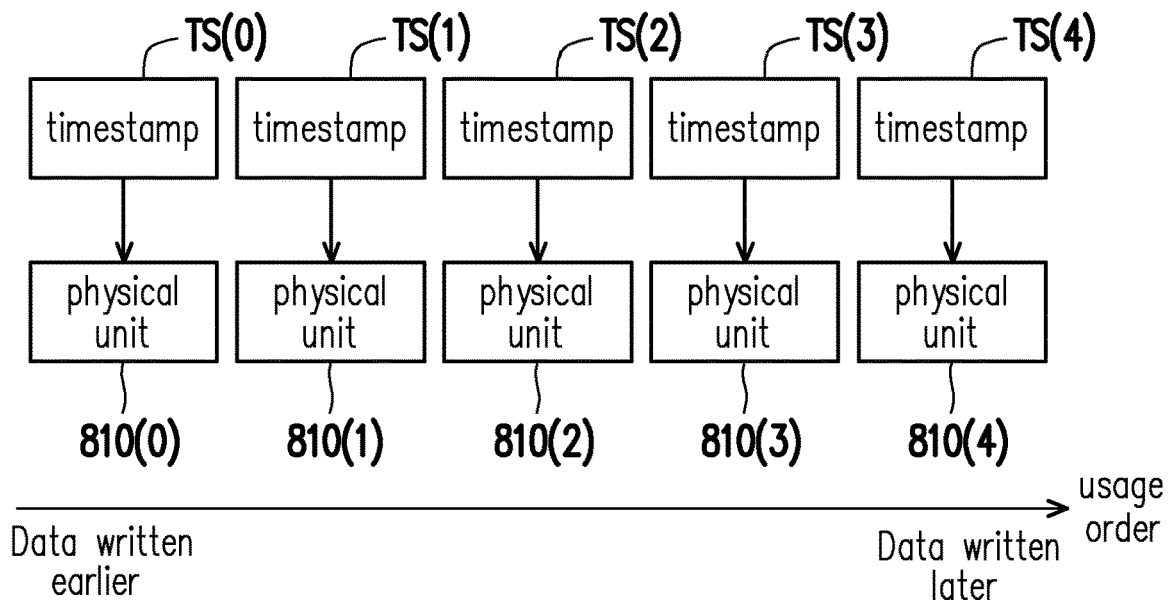
FIG. 8 is a schematic diagram of updating the written stamp of a physical unit according to an exemplary embodiment of the disclosure.

FIG. 8 is a schematic diagram of updating the written stamp of a physical unit according to an exemplary embodiment of the disclosure. Please refer to FIG. 8, assuming that the physical units 810(0) to 810(4) are sequentially written with data. That is, in the physical units 810(0) to 810(4), the physical unit 810(0) is written with data earlier, and the physical unit 810(4) is written with data later. The memory management circuit 502 may allocate timestamps (i.e., written stamps) TS(0) to TS(4) to the physical units 810(0) to 810(4), respectively. For example, corresponding to the write operation of writing data into the physical unit 810(i), the timestamp TS(i) may be allocated to the physical unit 810(i); i is between 0 and 4. In this way, the timestamps TS(0) to TS(4) may reflect the usage order of the physical units 810(0) to 810(4).

Figure 9:
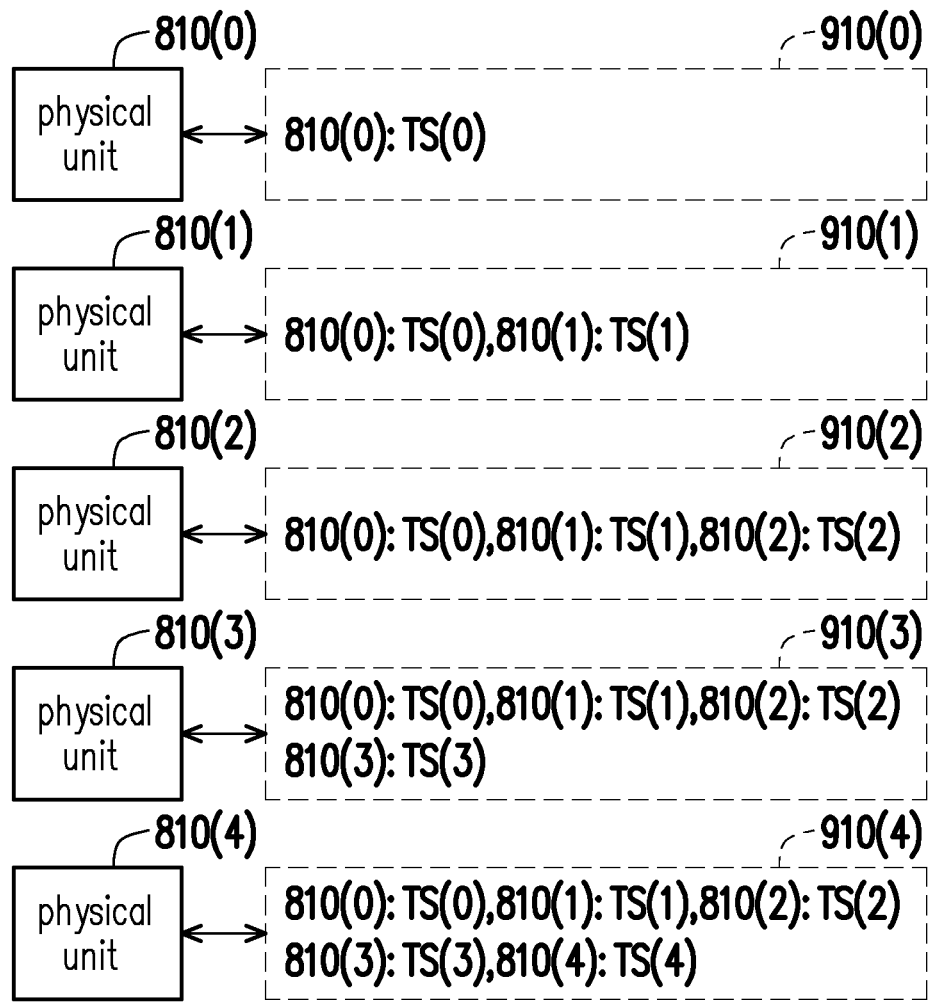
FIG. 9 is a schematic diagram illustrating recording unit management information according to an exemplary embodiment of the disclosure.

FIG. 9 is a schematic diagram illustrating recording unit management information according to an exemplary embodiment of the disclosure. Referring to FIG. 8 and FIG. 9, corresponding to the operation of writing data to the physical units 810(0) to 810(4) in sequence, the unit management information 910(0) to 910(4) may be recorded. For example, the unit management information 910(j) corresponding to the physical unit 810(j) may reflect that the physical units 810(0) to 810(j) with the timestamps TS(0) to TS(j) have been used and the usage order of the used physical units 810(0) to 810(j); j is between 1 and 4. Moreover, the unit management information 910(j) may be generated based on the unit management information 910(j−1). For example, the unit management information 910(4) may be generated based on the unit management information 910(3), including adding the sequence information of the used physical unit 810(4) to the sequence information of the used physical units 810(0) to 810(3). Furthermore, the unit management information 910(0) to 910(4) may be respectively recorded in the physical units 810(0) to 810(4) or additionally recorded in a specific management table, which is not limited by the disclosure.

Figure 10:
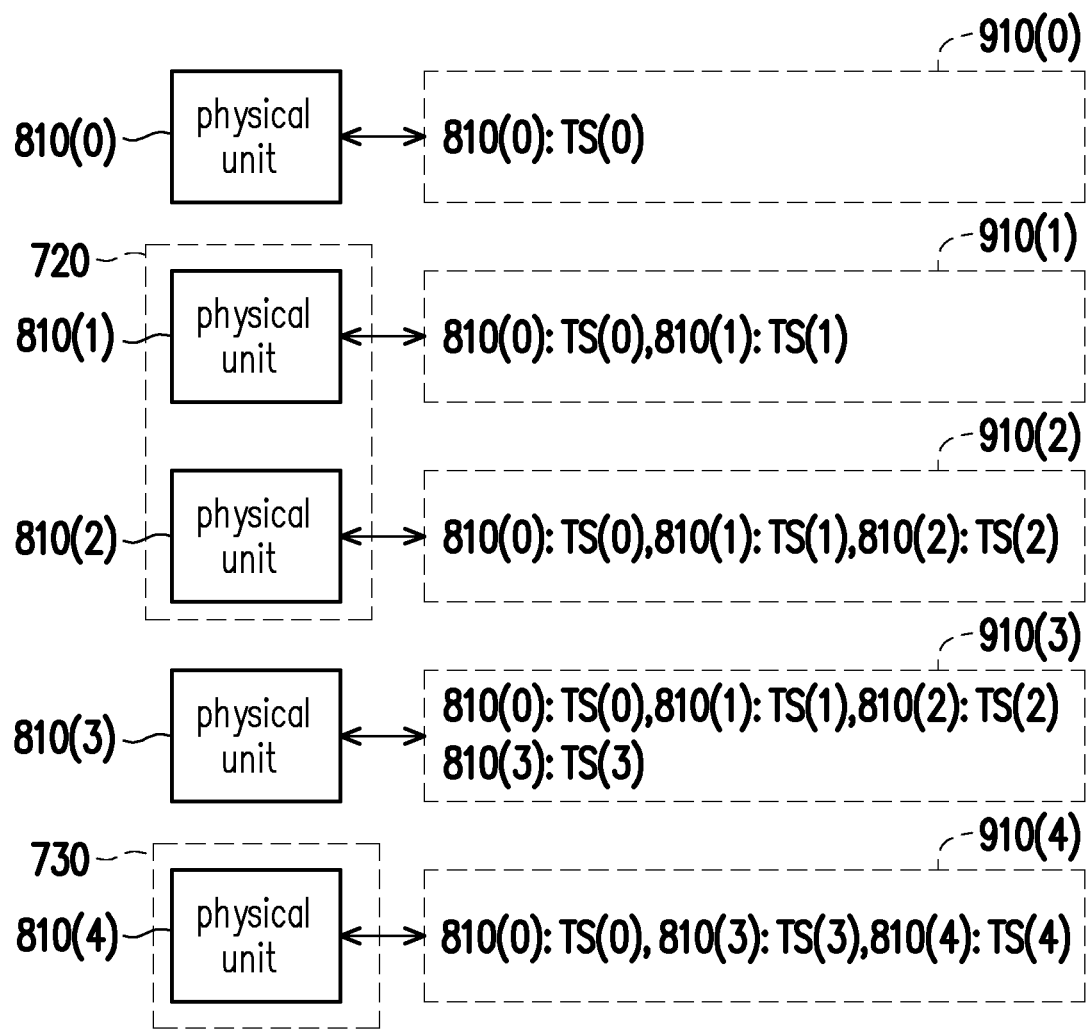
FIG. 10 is a schematic diagram illustrating recording unit management information according to an exemplary embodiment of the disclosure.

FIG. 10 is a schematic diagram illustrating recording unit management information according to an exemplary embodiment of the disclosure. Please refer to FIG. 7, FIG. 8 and FIG. 10. It should be noted that, in this exemplary embodiment, the physical units 810(1) and 810(2) belong to the source unit 720 and the physical unit 810(4) belongs to the target unit 730. Therefore, in the data merge operation, the valid data stored in the physical units 810(1) and 810(2) may be collected and copied to the physical unit 810(4). After the data merge operation is performed, the data in the physical units 810(1) and 810(2) become invalid data. Corresponding to writing data to the physical units 810(0) to 810(4) in sequence, the unit management information 910(0) to 910(4) may also be recorded. For example, the unit management information 910(j) may be generated based on the unit management information 910(j−1).

It should be noted that, compared to the exemplary embodiment of FIG. 9, in the exemplary embodiment of FIG. 10, in response to the data merge operation of copying data from the physical units 810(1) and 810(2) to the physical unit 810(4), the recorded unit management information 910(4) may contain the sequence information of the used physical units 810(0), 810(3) and 810(4), but not the sequence information of the physical units 810(1) and 810(2) used as source unit. For example, in the process of generating the unit management information 910(4), the memory management circuit 502 may remove the sequence information of the physical units 810(1) and 810(2) used as the source unit from the unit management information 910(3) and add the sequence information of the new physical unit 810(4) to generate unit management information 910(4). In this way, compared with the exemplary embodiment of FIG. 9, in the exemplary embodiment of FIG. 10, the unit management information 910(4) may not contain the sequence information of the physical units 810(1) and 810(2) that clearly only store invalid data.

In an exemplary embodiment, the memory management circuit 502 may perform a data recovery operation to recover data that may be lost or damaged in the rewritable non-volatile memory module 43. For example, the cause for the loss or damage of the data may include unexpected power failure of the memory storage device 10 and/or the host system 11, unexpected termination of the data writing process, unexpected termination of the data reading process, unexpected termination of the data erasing process, dramatic shaking of device and/or dramatic change of environment temperature, etc., which is not limited by the disclosure.

In an exemplary embodiment, during the data recovery operation, the memory management circuit 502 may search for the physical unit with the latest written stamp among the multiple physical units of FIG. 6. The memory management circuit 502 may obtain the corresponding unit management information (also referred to as the third unit management information) according to the physical unit with the latest written stamp. For example, the third unit management information may reflect the usage order of multiple used physical units (also referred to as the third used physical unit). The memory management circuit 502 may scan the multiple third used physical units according to the third unit management information to read the data (including valid data) in the multiple third used physical units. The memory management circuit 502 may reconstruct the mapping table (that is, the logical-to-physical mapping table) based on the read data and recover the lost or damaged data.

Taking the exemplary embodiments of FIG. 8 and FIG. 9 as an example, after recording the timestamps TS(0) to TS(4) and the unit management information 910(0) to 910(4), in the data recovery operation, the memory management circuit 502 may obtain the physical unit last used (that is, written with data) as the physical unit 810(4) according to the timestamps TS(0) to TS(4) (because the physical unit 810(4) has the latest timestamp TS(4)). Thereafter, the memory management circuit 502 may determine that the physical unit to be scanned includes the physical units 810(0) to 810(4) according to the unit management information 910(0) corresponding to the physical unit 810(4) and scan the physical units 810(0) to 810(4), so as to read the data from the physical units 810(0) to 810(4) to recover the needed data (i.e., valid data).

On the other hand, taking the exemplary embodiments of FIG. 8 and FIG. 10 as an example, after recording the timestamps TS(0) to TS(4) and the unit management information 910(0) to 910(4), in the data recovery operation, the memory management circuit 502 may also obtain the last used physical unit (i.e., written with data) as the physical unit 810(4) according to the timestamps TS(0) to TS(4). However, it should be noted that in the exemplary embodiment of FIG. 10, the memory management circuit 502 may determine that the physical unit to be scanned includes the physical units 810(0), 810(3) and 810(4) according to the unit management information 910(0) corresponding to the physical unit 810(4).

Figure 11:
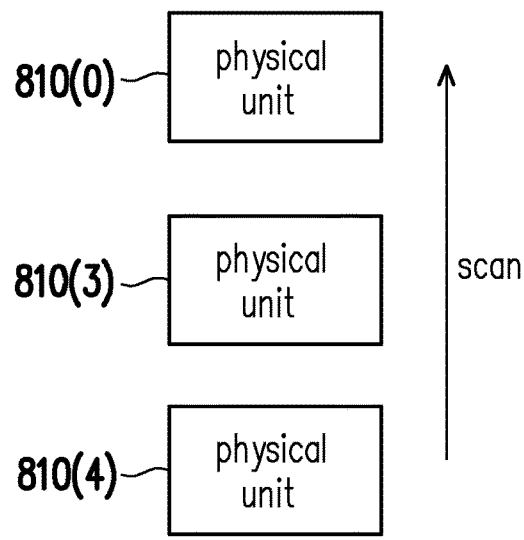
FIG. 11 is a schematic diagram of scanning physical units in a data recovery operation according to an exemplary embodiment of the disclosure.

FIG. 11 is a schematic diagram of scanning physical units in a data recovery operation according to an exemplary embodiment of the disclosure. Referring to FIG. 10 and FIG. 11, after it is determined that the physical unit to be scanned includes the physical units 810(0), 810(3), and 810(4), during the data recovery operation, the memory management circuit 502 can skip the physical units 810(1) and 810(2), and scan the physical units 810(0), 810(3), and 810(4). For example, the scanning sequence may be to scan the physical units 810(4), 810(3), and 810(0) in sequence to read data from the physical units 810(0), 810(3), and 810(4) to recover the needed data (i.e., valid data).

It should be noted that in another exemplary embodiment of FIG. 10, if the physical units 810(0) to 810(4) are scanned one by one according to the unit management information 910(4) of FIG. 9, the time of performing the data recovery operation will be prolonged. Additional scanning time and system resources will be spent on scanning the physical units 810(1) and 810(2) that clearly do not store valid data. However, if the operation is performed as described in the exemplary embodiment of FIG. 10, in the data recovery operation, the physical units 810(1) and 810(2) are skipped and the physical units 810(0), 810(3) and 810(4) are scanned, by reducing the total number of physical units that need to be scanned, the efficiency of performing the data recovery operation can be effectively improved without affecting the stability of the data recovery operation (for example, reduce the time of performing the data recovery operation).

Figure 12:
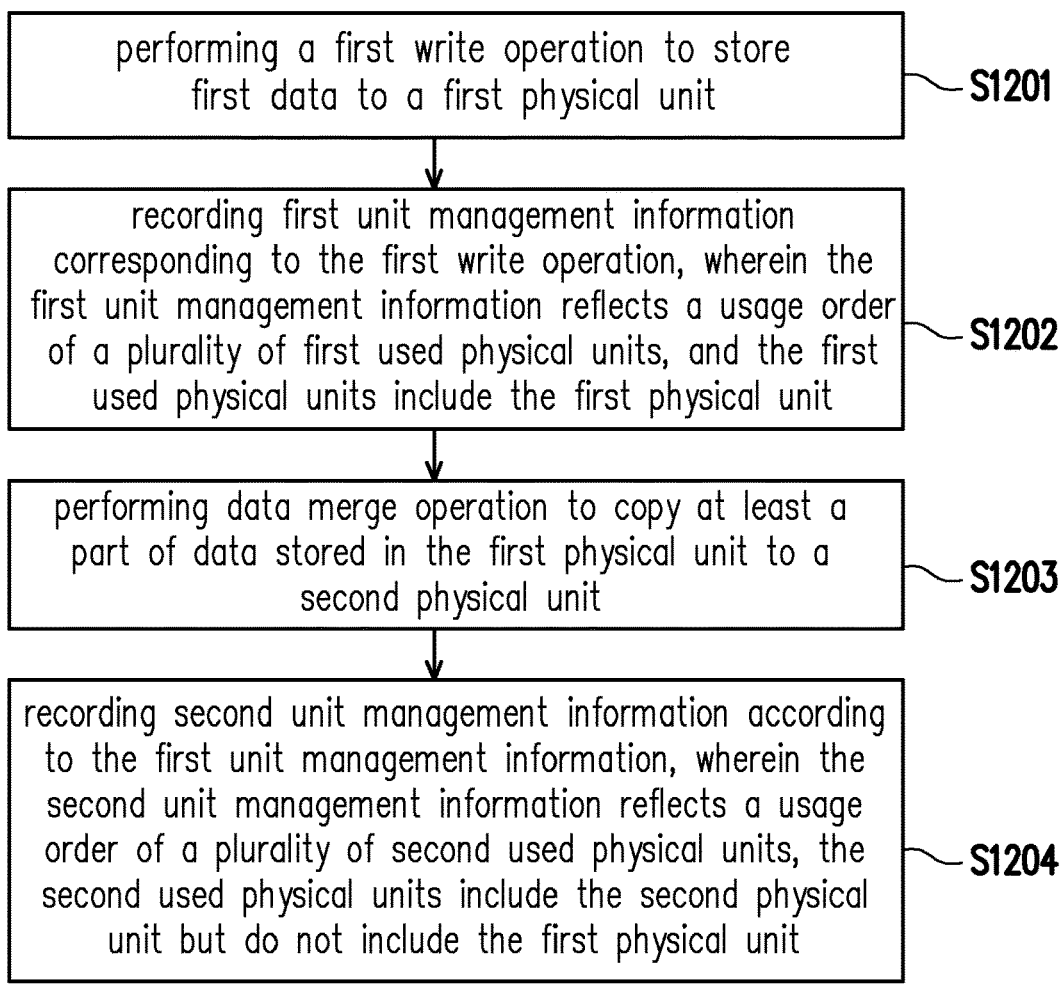
FIG. 12 is a flowchart of a memory management method according to an exemplary embodiment of the disclosure.

FIG. 12 is a flowchart of a memory management method according to an exemplary embodiment of the disclosure. Referring to FIG. 12, in step S1201, a first write operation is performed to store the first data in the first physical unit. In step S1202, first unit management information is recorded corresponding to the first write operation, and the first unit management information reflects the usage order of multiple first used physical units, and the multiple first used physical units include the first physical unit. In step S1203, a data merge operation is performed to copy at least part of the data in the first physical unit to the second physical unit. After the data merge operation is performed, in step S1204, the second unit management information is recorded according to the first unit management information, and the second unit management information reflects the usage order of multiple second used physical units. More specifically, the multiple second used physical units include the second physical unit but do not include the first physical unit.

Figure 13:
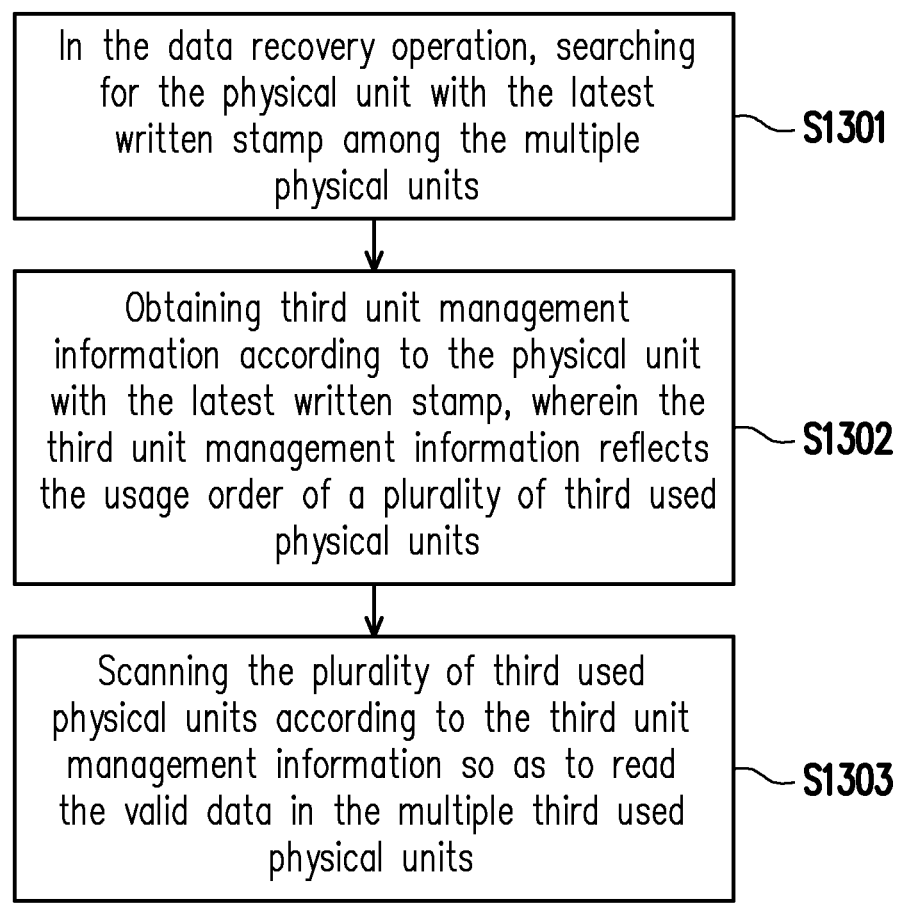
FIG. 13 is a flowchart of a memory management method according to an exemplary embodiment of the disclosure.

FIG. 13 is a flowchart of a memory management method according to an exemplary embodiment of the disclosure. Referring to FIG. 13, in step S1301, in the data recovery operation, the physical unit with the latest written stamp is searched among multiple physical units. In step S1302, the third unit management information is obtained according to the physical unit with the latest written stamp, and the third unit management information reflects the usage order of the multiple third used physical units. In step S1303, the multiple third used physical units are scanned according to the third unit management information to read the valid data in the multiple third used physical units.

However, various steps in FIG. 12 and FIG. 13 have been described in detail as above, and will not be repeated here. It should be noted that the steps in FIG. 12 and FIG. 13 may be implemented as multiple program codes or circuits, and the disclosure provides no limitation thereto. In addition, the methods in FIG. 12 and FIG. 13 may be used in conjunction with the above exemplary embodiments, or can be used alone, and the disclosure is not limited thereto.

In summary, the exemplary embodiments provided by the disclosure may record the written stamp and unit management information corresponding to the physical units according to the usage order of the multiple physical units. More specifically, the recorded unit management information may not include the sequence information of the physical unit that has been used as the source unit. In this way, subsequently, the efficiency of performing the data recovery operation can be effectively improved without affecting the stability of the data recovery operation (for example, reduce the time of performing the data recovery operation).

Although the disclosure has been disclosed in the above embodiments, it is not intended to limit the disclosure. Anyone with ordinary knowledge in the relevant technical field can make some modifications and changes without departing from the spirit and scope of the disclosure. Therefore, the scope to be protected by the disclosure shall be subject to those defined by the attached claims.

What is claimed is:

1. A memory management method, adaptable for a rewritable non-volatile memory module, the rewritable non-volatile memory module comprising a plurality of physical units and the memory management method comprising:
   performing a first write operation to store a first data in a first physical unit of the plurality of physical units;
   recording first unit management information corresponding to the first write operation, wherein the first unit management information reflects a usage order of a plurality of first used physical units, and the plurality of first used physical units comprise the first physical unit;
   performing a data merge operation to copy at least a part of the data in the first physical unit to a second physical unit of the plurality of physical units; and
   after performing the data merge operation, recording second unit management information according to the first unit management information, wherein the second unit management information reflects a usage order of a plurality of second used physical units, the plurality of second used physical units comprise the second physical unit but not the first physical unit,
   wherein the first unit management information comprises sequence information of the plurality of first used physical units, the second unit management information comprises sequence information of the plurality of second used physical units, and the step of recording the second unit management information according to the first unit management information comprises:
   removing sequence information of the first physical unit from the sequence information of the plurality of first used physical units; and
   obtaining the sequence information of the plurality of second used physical units according to sequence information of the second physical unit and the remaining physical units in the plurality of the first used physical units.

2. The memory management method according to claim 1, wherein the first unit management information and the second unit management information are respectively stored in the first physical unit and the second physical unit.

3. The memory management method according to claim 1, further comprising:
   before performing the data merge operation, performing a second write operation to store a second data in a third physical unit in the plurality of physical units,
   wherein the plurality of second used physical units further comprise the third physical unit.

4. The memory management method according to claim 1, further comprising:
   corresponding to the first write operation, updating a written stamp corresponding to the first physical unit; and
   corresponding to the data merge operation, updating a written stamp corresponding to the second physical unit.

5. The memory management method according to claim 4, further comprising:
   in a data recovery operation, searching for a physical unit with the latest written stamp among the plurality of physical units;
   obtaining third unit management information according to the physical unit with the latest written stamp, wherein the third unit management information reflects a usage order of a plurality of third used physical units; and
   scanning the plurality of third used physical units according to the third unit management information.

6. A memory storage device, comprising:
   a connection interface unit, coupled to a host system;
   a rewritable non-volatile memory module, comprising a plurality of physical units; and
   a memory control circuit unit, coupled to the connection interface unit and the rewritable non-volatile memory module,
   wherein the memory control circuit unit is configured for:
      performing a first write operation to store a first data in a first physical unit of the plurality of physical units;
      recording first unit management information corresponding to the first write operation, wherein the first unit management information reflects a usage order of a plurality of first used physical units, and the plurality of first used physical units comprise the first physical unit;
      performing a data merge operation to copy at least a part of the data in the first physical unit to a second physical unit of the plurality of physical units; and
      after performing the data merge operation, recording second unit management information according to the first unit management information, wherein the second unit management information reflects a usage order of a plurality of second used physical units, the plurality of second used physical units comprise the second physical unit but not the first physical unit,
   wherein the first unit management information comprises sequence information of the plurality of first used physical units, the second unit management information comprises sequence information of the plurality of second used physical units, and the operation of recording the second unit management information according to the first unit management information comprises:
   removing sequence information of the first physical unit from the sequence information of the plurality of first used physical units; and
   obtaining the sequence information of the plurality of second used physical units according to sequence information of the second physical unit and the remaining physical units in the plurality of the first used physical units.

7. The memory storage device according to claim 6, wherein the first unit management information and the second unit management information are respectively stored in the first physical unit and the second physical unit.

8. The memory storage device according to claim 6, wherein the memory control circuit unit is further configured for:
   before performing the data merge operation, performing a second write operation to store a second data in a third physical unit in the plurality of physical units,
   wherein the plurality of second used physical units further comprise the third physical unit.

9. The memory storage device according to claim 6, wherein the memory control circuit unit is further configured for:

corresponding to the first write operation, updating a written stamp corresponding to the first physical unit; and corresponding to the data merge operation, updating a written stamp corresponding to the second physical unit.

10. The memory storage device according to claim 9, wherein the memory control circuit unit is further configured for:

in a data recovery operation, searching for a physical unit with the latest written stamp among the plurality of physical units;

obtaining third unit management information according to the physical unit with the latest written stamp, wherein the third unit management information reflects a usage order of a plurality of third used physical units; and scanning the plurality of third used physical units according to the third unit management information.

11. A memory control circuit unit, configured to control a rewritable non-volatile memory module, the memory control circuit unit comprising:

a host interface, coupled to a host system;

a memory interface, coupled to the rewritable non-volatile memory module, wherein the rewritable non-volatile memory module comprises a plurality of physical units; and a memory management circuit, coupled to the host interface and the memory interface, wherein the memory management circuit is configured for:

performing a first write operation to store a first data in a first physical unit of the plurality of physical units;

recording first unit management information corresponding to the first write operation, wherein the first unit management information reflects a usage order of a plurality of first used physical units, and the plurality of first used physical units comprise the first physical unit;

performing a data merge operation to copy at least a part of the data in the first physical unit to a second physical unit of the plurality of physical units; and after performing the data merge operation, recording second unit management information according to the first unit management information, wherein the second unit management information reflects a usage order of a plurality of second used physical units, the plurality of second used physical units comprise the second physical unit but not the first physical unit, wherein the first unit management information comprises sequence information of the plurality of first used physical units, the second unit management information comprises sequence information of the plurality of second used physical units, and the operation of recording the second unit management information according to the first unit management information comprises:

removing sequence information of the first physical unit from the sequence information of the plurality of first used physical units; and obtaining the sequence information of the plurality of second used physical units according to sequence information of the second physical unit and the remaining physical units in the plurality of the first used physical units.

12. The memory control circuit unit according to claim 11, wherein the first unit management information and the second unit management information are respectively stored in the first physical unit and the second physical unit.

13. The memory control circuit unit according to claim 11, wherein the memory management circuit is further configured for:

before performing the data merge operation, performing a second write operation to store a second data in a third physical unit in the plurality of physical units, wherein the plurality of second used physical units further comprise the third physical unit.

14. The memory control circuit unit according to claim 11, wherein the memory management circuit is further configured for:

corresponding to the first write operation, updating a written stamp corresponding to the first physical unit; and corresponding to the data merge operation, updating a written stamp corresponding to the second physical unit.

15. The memory control circuit unit according to claim 14, wherein the memory management circuit is further configured for:

in a data recovery operation, searching for a physical unit with the latest written stamp among the plurality of physical units;

obtaining third unit management information according to the physical unit with the latest written stamp, wherein the third unit management information reflects a usage order of a plurality of third used physical units; and scanning the plurality of third used physical units according to the third unit management information.

* * * * *